United States Patent [19]
Kundu

[11] Patent Number: 5,974,192
[45] Date of Patent: Oct. 26, 1999

[54] SYSTEM AND METHOD FOR MATCHING BLOCKS IN A SEQUENCE OF IMAGES

[75] Inventor: Amlan Kundu, Lafayette, Colo.

[73] Assignees: U S West, Inc., Denver; MediaOne Group, Inc., Englewood, both of Colo.

[21] Appl. No.: 08/643,689

[22] Filed: May 6, 1996

Related U.S. Application Data

[63] Continuation-in-part of application No. 08/561,679, Nov. 22, 1995.
[51] Int. Cl.$^6$ .............................. G06K 9/36; G06K 9/40; H04N 5/21
[52] U.S. Cl. ......................... 382/260; 382/236; 382/254; 382/261; 382/262; 382/275; 348/607
[58] Field of Search .................................... 382/231, 233, 382/235, 236, 260, 261, 262, 254, 275; 348/607

[56] References Cited

U.S. PATENT DOCUMENTS

| | | | |
|---|---|---|---|
| 5,218,649 | 6/1993 | Kundu et al. ............................. | 382/180 |
| 5,327,509 | 7/1994 | Rich ....................................... | 382/108 |
| 5,500,685 | 3/1996 | Kokaram ................................. | 382/275 |
| 5,625,715 | 4/1997 | Trew et al. .............................. | 382/236 |

OTHER PUBLICATIONS

"Digital Step Edpes From Zero Crossing of Second Directional Derivatives", Haralick, Jan. 1984.
A. Kundu, "Enhancement of JPEG Coded Images by Adaptive Spatial Filtering", Sep. 1995, IEEE, pp. 187–190.
D. Le Gall, "MPEG: A Video Compression Standard for Multimedia Applications", Communications of the ACM, Apr. 1991/vol. 34, No. 4, pp. 47–58.
A. K. Jain, "Fundamentals of Digital Image Processing", Prentice Hall, New Jersey, 1989, pp. 51–57.
L. Yan, "Noise Reduction for MPEG Type of Codec", Apr. 1994, IEEE, AT&T Bell Laboratories, Holmdel, NJ, pp. V–429—V432.
R. A. Gopinath et al., "Wavelet–Based Post–Processing of Low Bit Rate Transform Coded Images", 1994, IEEE, pp. 913–917.

(List continued on next page.)

*Primary Examiner*—Phuoc Tran
*Assistant Examiner*—Daniel G. Mariam
*Attorney, Agent, or Firm*—Judson D. Carey; Holme, Roberts & Owen LLP

[57] ABSTRACT

Blocks in frames of a video are matched to similar blocks across frames using qualitative characteristics of the pixels in the block. Pixels in a frame are categorized into two or more categories. In one embodiment, three pixel categories are: 1) quasi-constant (QC) pixels having intensity values that vary slowly (e.g., pictorial portions), 2) textured pixels characterized by many small edges and thin-line signals (e.g., texture portions), and 3) dominant-edge (DE) pixels characterized by few sharp and dominant edges (e.g., edge portions). Blocks in different frames are matched by minimizing a cost function that measures the mismatch between a block in a first frame and a plurality of candidate blocks in a second frame. In one embodiment, a cost function comprises a contrast component and a brightness component. The brightness component is determined as a function of the pixel categories. Block matching in sequential frames of a video enables a calculation of displacement or motion estimation in the video. Motion estimation is used, for example, in video compression to encode a reference frame and subsequent displacements of blocks in the frame. The present block-matching invention is also useful in pre-processing video images to minimize noise. Blocks (or even pixels) in a reference frame are matched to corresponding blocks (or pixels) in prior frame and subsequent frames. Various visual components (e.g., contrast, brightness, color) of the matched blocks are used to generate a modified visual component for the block in the reference frame. Noise and other defects are thereby significantly reduced.

7 Claims, 9 Drawing Sheets

OTHER PUBLICATIONS

T. Liu et al., "Adaptive Post–Processing Algorithms for Low Bit Rate Video Signals", 1994, IEEE, 99. V–401—V404.

V. Ramamoorthy, "Removal of 'Staircase' Effects in Coarsley Quantized Video Sequence", Sep. 1992, IEEE, pp. III–309 to III–312.

J. Canny, "A Computational Approach to Edge Detection", Nov. 1986, IEEE, vol. PAMI–8, No. 6., pp. 679–698.

A. Kundu et al., "A New Algorithm for Image for Edge Extraction Using A Statisical Classifier Approach", Jul. 1987, IEEE, vol. PAMI–9, No. 4., pp. 569–577.

P. J. Bickel et al., "The Asymptotic Theory of Galton's Test and a Related Simple Estimate of Location", 1967, pp. 73–89, Annals of Mathematical Statistics.

A. Nieminen et al., "A New Class of Detail–Preserving Filters for Image Processing", Jan. 1987, IEEE, vol. PAMI–9, No. 1, pp. 74–90.

SYSTEM AND METHOD FOR MATCHING BLOCKS IN A SEQUENCE OF IMAGES

RELATED U.S. APPLICATION DATA

This application is a continuation in part of a U.S. patent application Ser. No. 08/561,679 titled System and Method for Enhancement of Coded Images Using Adaptive Spatial Filtering, filed on Nov. 22, 1995, by Amlan Kundu and assigned to U S WEST, Inc., the contents of which are incorporated herein by reference.

BACKGROUND OF THE INVENTION

1. Field of the Invention

This invention generally relates to video motion or displacement estimation and video processing, and more specifically to a system and method for matching blocks in a sequence of images.

2. Description of the Related Art

Image or video encoding is widely used in the cable, interenet, computer, CD ROM, video-conferencing, and other industries. Common image or video coding schemes (e.g., the Motion Picture Expert Group (MPEG) image coding scheme) define blocks of pixels in an image for coding and motion estimation purposes (e.g., typically blocks of 16 by 16 or 8 by 8 pixels are used in the coding process). In a video comprising a sequence of images or frames, motion or displacement of a block in one frame to a similar block in the next frame is used to reduce the encoded video storage space and decrease the time required to transmit the video over a fixed bandwidth medium. Using such a scheme, each block of an initial frame is encoded, then the displacement (if any) of each block in subsequent frames is determined and encoded (e.g., in a vector) along with its residual (i.e., original block minus predicted value). Decoding comprises decoding the initial frame, and simply adding the displacement residual of each block to create each subsequent frame in the video.

Key to the block motion or displacement estimation method is the matching of a specific block (i.e., group of pixels) from one frame to the same or similar block (i.e., group of pixels) in the next frame in order to determine the relative displacement of the block.

Conventional methods match blocks in each frame by using a measurement of intensity and/or contrast of the blocks from one frame to the next (e.g., two blocks in two sequential frames having the same intensity are likely to be matching blocks). Conventional methods do not use information about the types of pixels in the block or otherwise utilize qualitative characteristics or information about the content of the block itself for matching purposes. Conventional methods have proven useful in some simple video applications such as slow-moving video, or low-resolution video. However, conventional techniques often grossly mismatch blocks in more difficult or "problem" videos such as fast-moving video (e.g., a basketball game). The decoded images sometimes appear blocked, granular, and/or fuzzy and are generally poor quality.

It would be beneficial to increase the accuracy of matching blocks in sequential frames of a video stream, and thus improve the encoding process, storage space, encoding time, and final video quality. In addition, it would be beneficial to have an accurate block matching method for various pre-processing enhancements of video images.

SUMMARY OF THE INVENTION

A block matching method matches similar blocks across frames in a video using qualitative characteristics of the pixels in the block. Pixels are categorized into two or more categories. In one embodiment three pixel categories are used: 1) pixels belonging to a quasi-constant (QC) category where the pixel intensity values vary slowly (e.g., pictorial portions), 2) pixels belonging to a textured category which are characterized by many small edges and thin-line signals (e.g., texture portions), and 3) pixels belonging to a dominant-edge (DE) category which are characterized by few sharp and dominant edges (e.g., edge portions). Collectively, the categories of each pixel in a block can be used to define the content and category of the block.

Blocks in sequential frames are matched by minimizing a cost function that measures the mismatch between a block in a first frame and a plurality of candidate blocks in a second frame. In one embodiment, a cost function comprises a contrast component and a brightness component. The brightness component is determined as a function of the pixel categories of the pixels in the block.

The present block-matching invention is also useful in pre-processing video images to minimize noise. Depending on the application, such pre-processing can be performed off-line. Blocks in a reference frame i are matched to corresponding blocks in the prior in frames, and subsequent n frames (in and n are generally equal) using the block-matching scheme of the present invention. Visual components of the matched blocks (e.g., contrast, brightness, color) are averaged and used to generate a modified visual component for the reference block. This process is continued for each block in each frame of the video. Such video pre-processing can also be performed on a pixel-by-pixel basis rather than a block basis. Further spatial filtering can be applied to pixels in each pixel category. For example, a D-filter can be applied to pixels in the quasi-constant category. Noise and other irregularities are significantly reduced in the final video.

DESCRIPTION OF THE PREFERRED EMBODIMENTS

Figure 1:
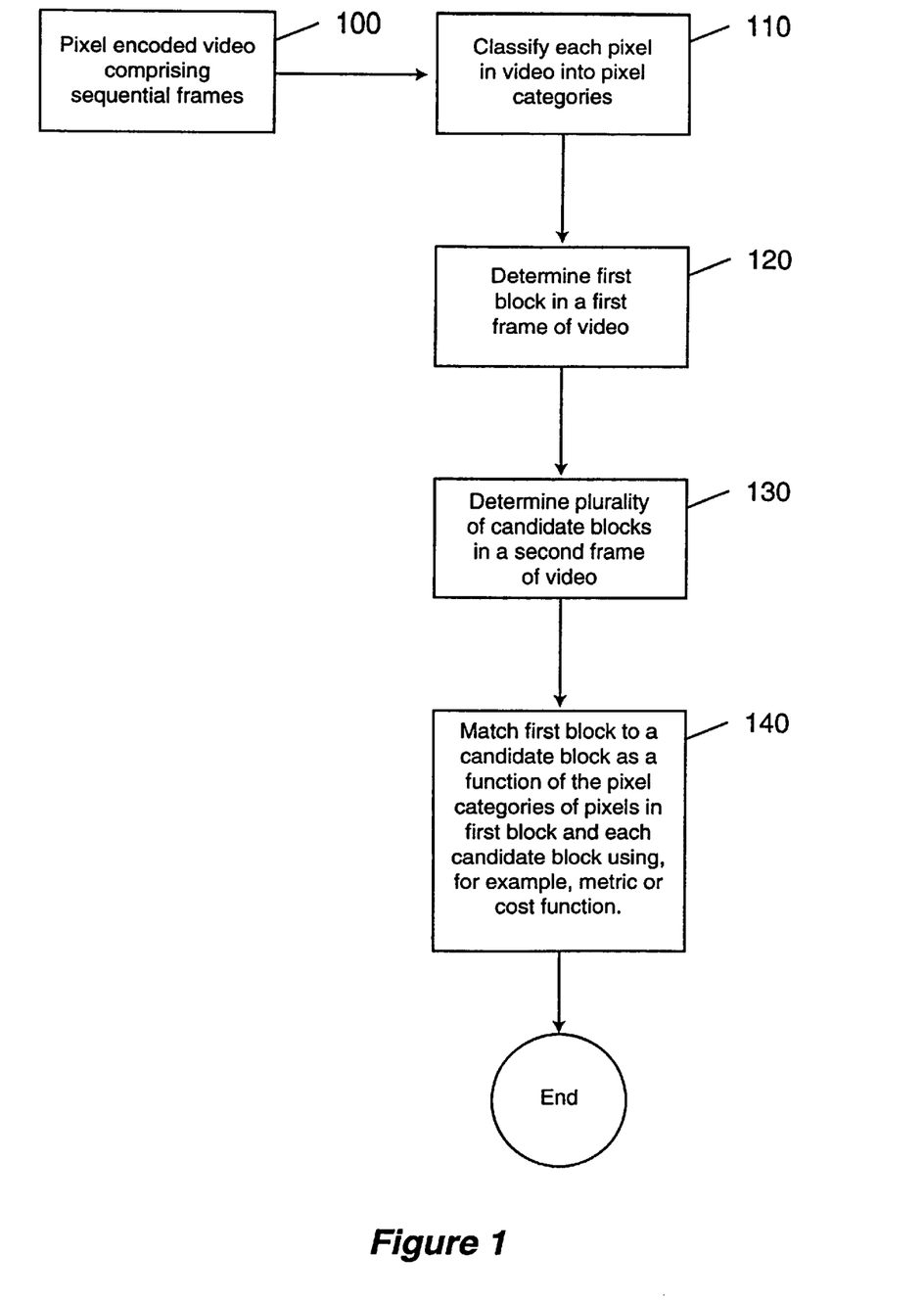
FIG. 1 is a high-level flowchart of one embodiment of the motion estimation method of the present invention.

FIG. 1 is a high-level flow chart illustrating the method of the present invention. Video 100 is a standard pixel encoded video comprising a plurality of sequential images or frames (for example a MPEG (Motion Picture Experts Group) encoded video). As used herein, a video is a sequence of one or more frames or images, wherein the frames are generally (but not necessarily) related in time. Each pixel in video 100 is classified 110 into a category or region as explained below. In another embodiment, some pixels may be classified into more than one category.

A first block is defined 120 in a first frame of video 100. A block comprises a plurality of pixels. Common blocks are 8×8 or 16×16 pixels in size. A plurality of candidate blocks are defined in a second frame 130 as further discussed below. Generally, candidate blocks 130 are of the same size as first block 120, and are in the general proximity of the first block (but in a second frame). In one embodiment, second frame follows the first frame temporally (for forward prediction; backward prediction is vice versa).

First block 120 is matched to a candidate block 130 by minimizing a cost function that measures the mismatch between first block each candidate block 140. In one embodiment, a cost function comprises a contrast component and a brightness component. The brightness component is determined as a function of the pixel categories of the pixels in first block 120, and the pixel categories of pixels in each candidate block 130, as described below.

Pixel Categorization

Figure 2:
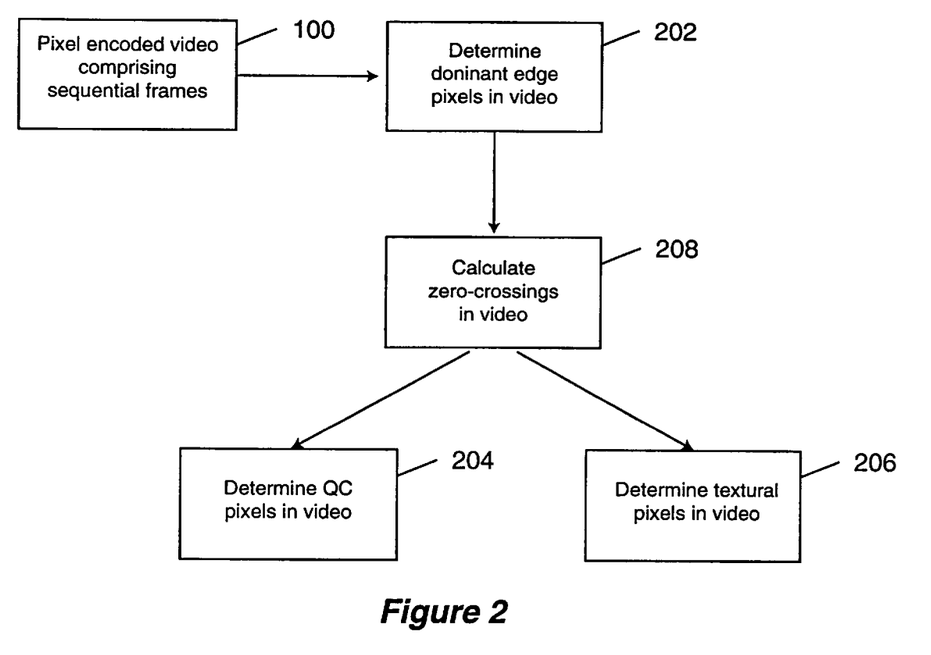
FIG. 2 is a high-level flowchart of one embodiment of the pixel classification method.

FIG. 2 is a high-level flowchart of one embodiment of pixel categorization 110 of pixels in video 100. In a preferred embodiment, each pixel in video 100 is classified into one of three pixel categories: quasi-constant, textured, and dominant-edge. Pixels belonging to quasi-constant (QC) category, also called QC pixels, have intensity values that vary slowly (e.g., pictorial portions). Pixels belonging to textured category, also called texels, are characterized by many small edges and thin-line signals (e.g., text portions). Pixels belonging to dominant-edge (DE) category, also called edges, are characterized by a few sharp and dominant edges (e.g., edge portions).

In a preferred embodiment, DE pixels in video I 00 are determined using conventional edge detection methods 202. As discussed below, QC pixels 204 and textural pixels 206 are distinguished from each other by calculating a zero-crossing measure 208 of video 100.

Figure 3:
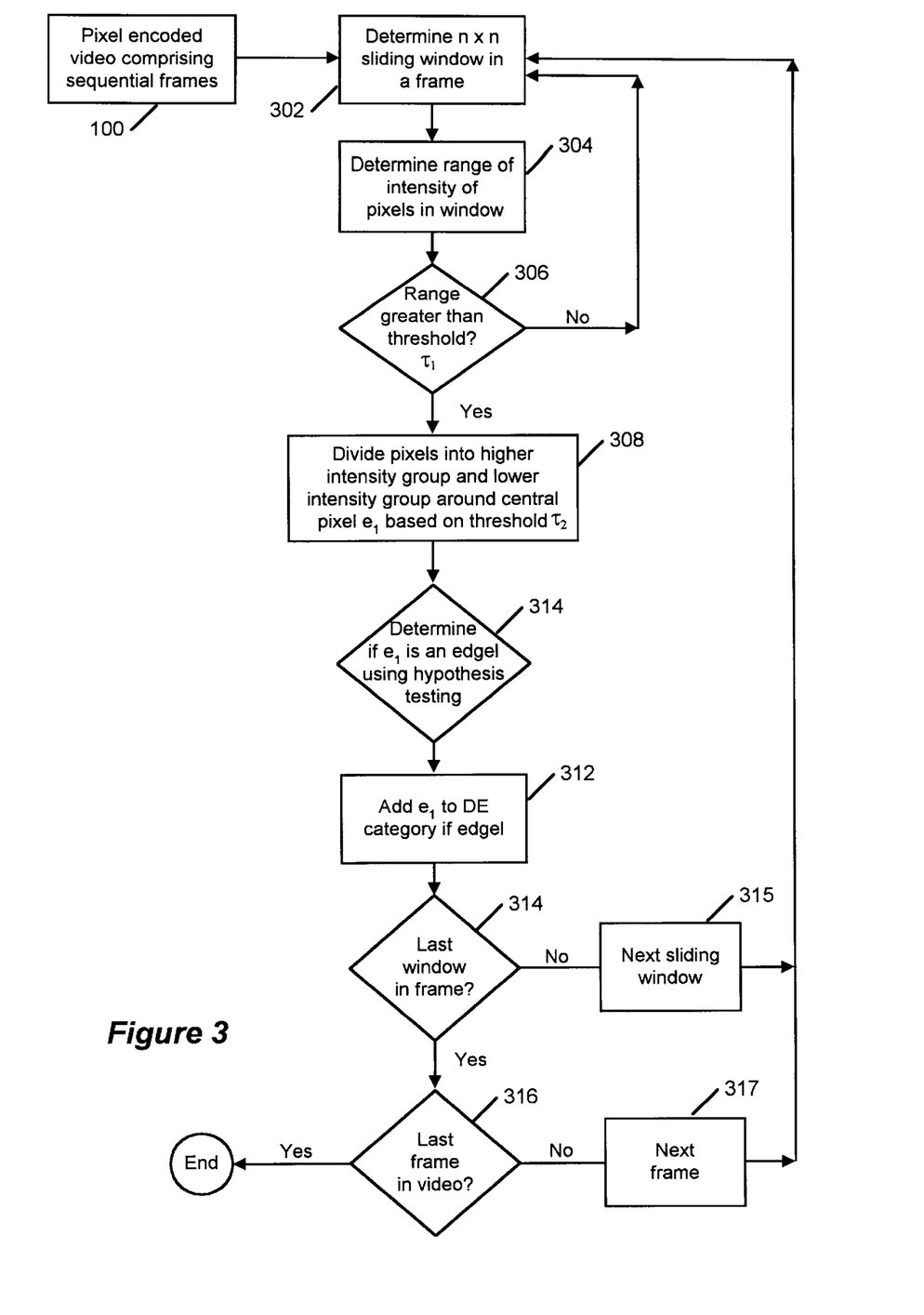
FIG. 3 is a flowchart of one embodiment of the dominant edge (DE) pixel classification method.

Referring now to FIG. 3, pixels in the DE category may be determined using several conventional edge detection methods 202. In a preferred embodiment, a relatively less computationally expensive edge operation can be used as defined by:

$$edge\_map = H^\alpha T^\alpha R \text{ (input\_image)}.$$

A sliding window 302 of n×n pixels is defined (e.g., a 3×3 pixel window). For each sliding window 302 in each frame of video 100, the operator R computes a measure of the range intensity of pixels inside the window 304. If the range is bigger than a threshold $t_1$, the central pixel of the window is considered likely to be an edgel, $e_1$, otherwise the next window 302 is examined 306. The threshold $t_1$ is determined, for example by the range of pixel values inside the window 302. The operator T divides the pixels centered around $e_1$ into two groups-a group of higher intensity and a group of lower intensity values 308. This stage is controlled by another threshold $t_2$. The threshold $t_2$ is determined, for example, by the range of the strength of the edges to be detected.

Let N be the number of pixels belonging to the group of higher intensity values. For most cases, N follows a standard normal distribution. The operator H uses a conventional hypotheses testing paradigm to determine whether or not the central pixel $e_1$ is an edgel in the DE category 310 (e.g., one hypothesis is that an edgel is present, another hypothesis is that it is not; the more likely hypothesis, based on a probability measure, will prevail). If an edgel is indicated, it is added to the DE category 312. The process is then repeated for each window 314, 315 in each frame 316, 317 of video 100. See generally, A. Kundu and S. K. Mitra, "Image Edge Extraction Using A Statistical Classifier Approach," IEEE Trans. Ok PAMI, PAMI-9, 4, 569–577, 1987. Other conventional edge detection methods can also be employed by the present invention. See, for example, J. Canny, "A Computational Approach to Edge Detection," IEEE Trans. Ok PAMI, Vol. 8, pp. 679–698, 1986.

Figure 4:
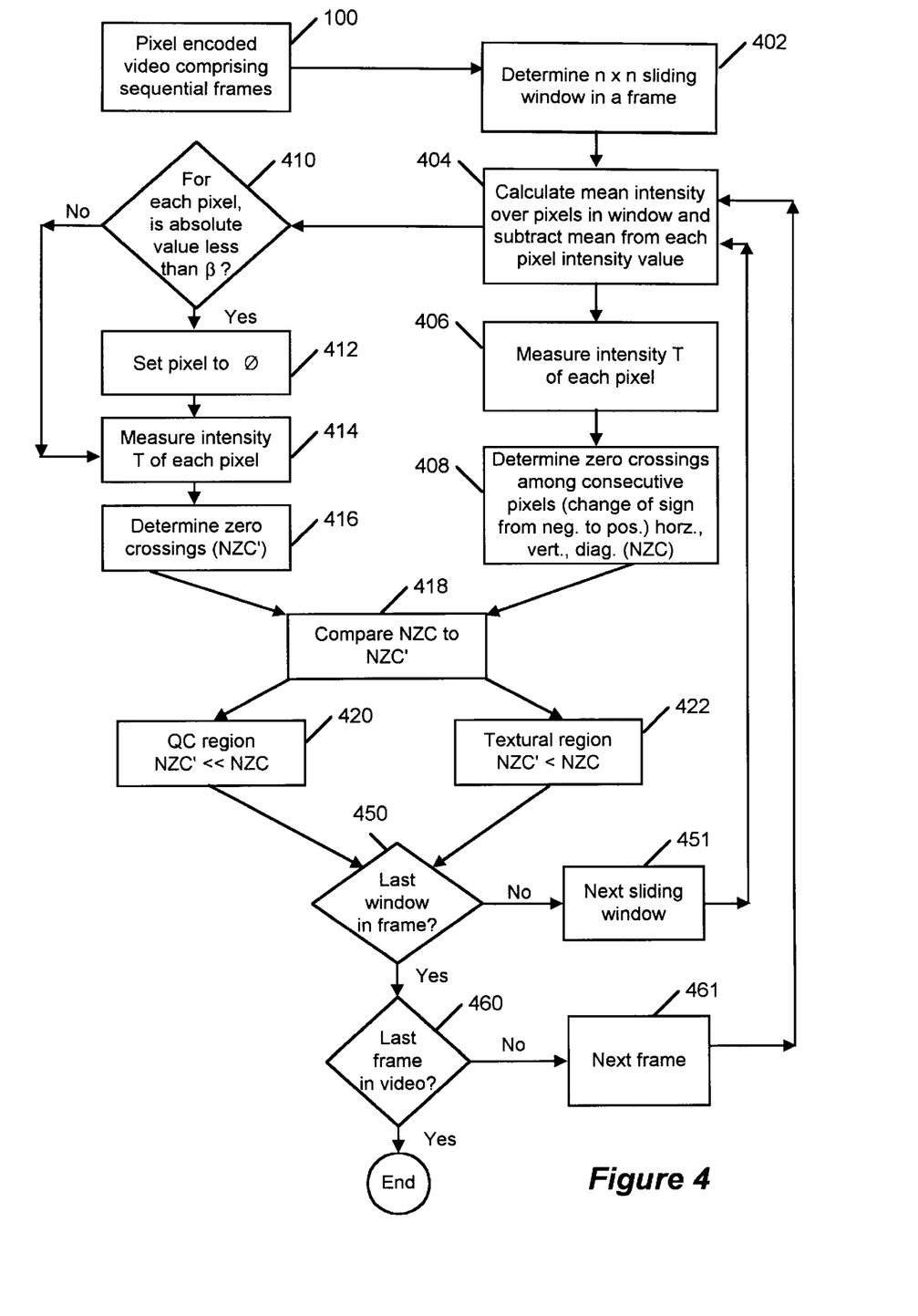
FIG. 4 is a flowchart of one embodiment of the textural and quasi-constant (QC) pixel classification method.

Referring now to FIG. 4, pixels belonging to the quasi-constant (QC) and textural regions are separated from each other by determining the number of zero-crossings and using a thresholding operation. In a preferred embodiment, a sliding window of n×n pixels is defined 402. The mean intensity is calculated over all the pixels in the window, and then subtracted from each pixel 404. The intensity value $T_i$ of each pixel is then measured 406. Some pixels will have a positive intensity, and others a negative intensity. The change of sign in the intensity values of two consecutive pixels in any particular direction is defined as a zero-crossing in that direction. The number of zero-crossings (NZC) are computed along each row, along each column, and along the two diagonal directions 408.

Both the QC and the textural regions have a relatively large value for the NZC pararneter. However, the NZC parameter is used along with several possible local standard deviation (LSD) measures to discriminate between the QC and the textural regions. In one embodiment, a simple parameter reflecting LSD is used. Namely, after the subtraction of the local mean from each pixel in the window, if the absolute value of any pixel intensity is less than a pre-selected threshold value, β, 410 that pixel intensity value is set to zero 412 (the threshold β is determined, for example, by the method described below). If the pixel intensity is greater than β the pixel intensity value remains unchanged. The NZC parameter is re-computed after this thresholding operation 414, 416. In a QC region, the new NZC value, NZC', is generally much less than the original NZC value 418, 420. In a textural region, NZC' is generally only slightly less than the original NZC value 418, 422. Thus, NZC' is used to discriminate between the QC and the textural regions. The process is then repeated for each window 450, 451 in each frame 460, 461 of video 100.

According to one embodiment of the invention, the method for determining QC and textual regions is a modification to the α-level crossing problem in stochastic process theory. Since the β-crossings in NZC' are counted along each one dimensional direction (1-D), the intensity values $T_i$ along each 1-D is the realization of a stochastic process where each random variable has a zero mean. It is assumed that the process is normal and differentiable. Then the level-crossing density (for level α) is given by:

$$\lambda_\alpha = 1/\pi \sqrt{(-R''(0)/R(0))} e^{-\alpha^2/2R(0)}$$

where R(τ) is the autocorrelation of the process. The objective is to find α (or β) such that (under mild assumptions) the number of level crossings for textural regions is guaranteed to be much higher than the number of level crossings for the QC regions. Let $R_1(\tau)$ be the autocorrelation of the process when the region under consideration is a quasi-constant region. Let $R_2(\tau)$ be the autocorrelation of the process when the region under consideration is a textural region. It is assumed that $R_1(\tau)$ has the form $c_1 f_1(\tau)$ where $f_1(0)=1, f_1(\infty)=0$ and $f_1'(\tau)$ is negative. It is also assumed that $R_2(\tau)$ has the form $c_2 f_2(\tau)\cos(\omega\tau)$ where $f_2(0)=1, f_1(\infty)=0$ and $f_2'(\tau)$ is negative. To be valid autocorrelation functions, $f_1(.)$ and $f_2(.)$ approach zero with $|\tau| \to \infty$. The perodic component of $R_2(\tau)$ is a simplistic assumption but understates the textural characteristics well because the autocorrelation in a textural region does not fall off monotonically as it does in a QC region. If $\Lambda$ is defined as:

$$\Lambda = \frac{\lambda_a \mid \text{texture}}{\lambda_a \mid \text{QCregion}}$$

The $\alpha$-level crossings of the textural region will be markedly more when the following constraint is satisfied.

$$\beta^2 = \alpha^2 > 3c_1/2$$

Here, $c_1$ is essentially the variance of the QC region. In general, it can be assumed that the variance rarely exceeds 4% of the dynamic range of the pixels in the image. Thus, for a dynamic range of 0–255, $\beta$ is approximately 12.

Figure 4A:
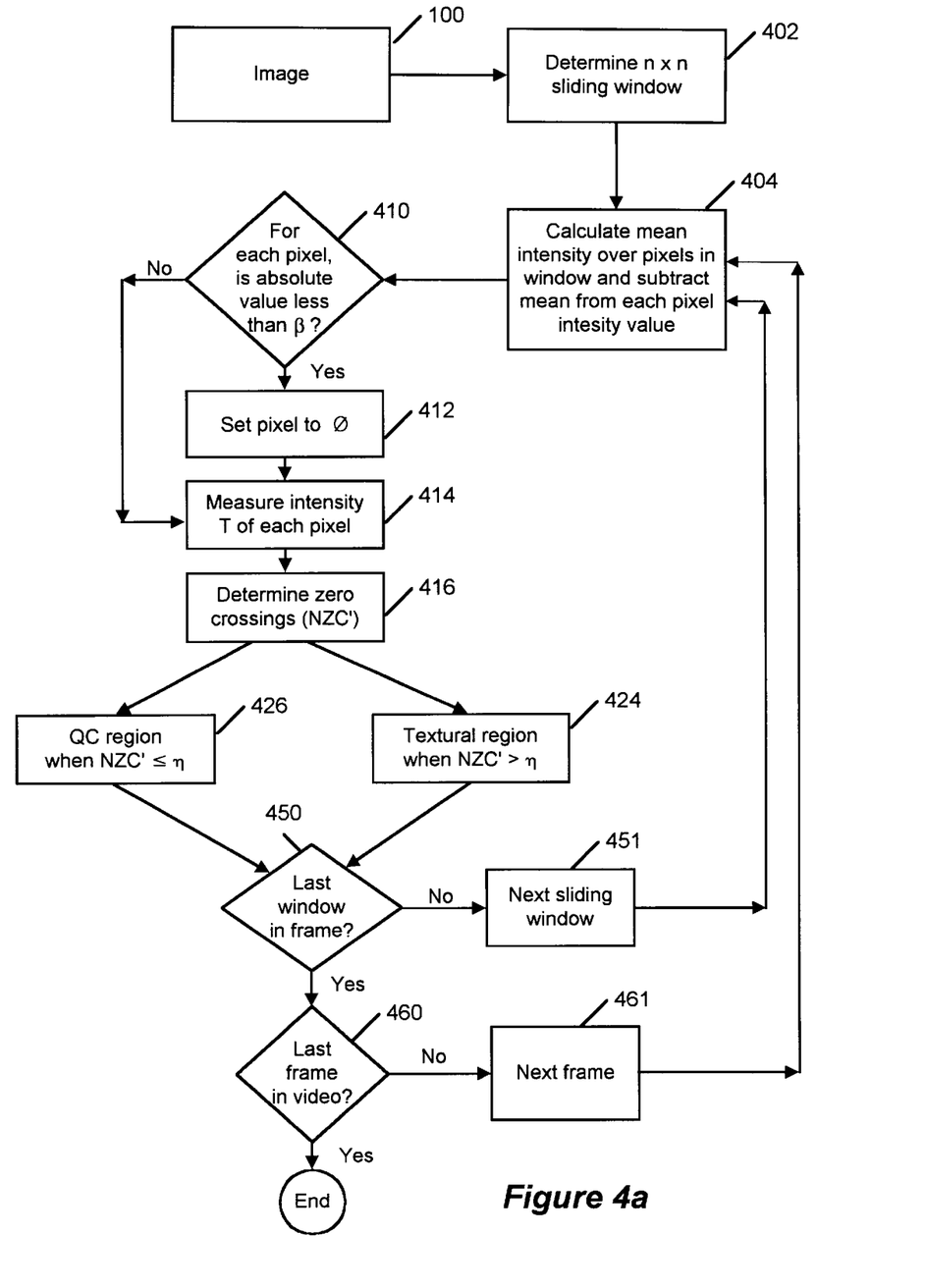
FIG. 4A is a flowchart of an alternative embodiment of the textural and quasi-constant (QC) pixel classification method.

A modified embodiment for distinguishing between textural and QC regions is shown in FIG. 4A. The pixel classification method can be performed as follows:

1) An edge operator is used to locate the dominant edges as discussed above (see, e.g., FIG. 3 and accompanying text).
2) NZC' is determined as discussed above (100, 402, 404, 410, 412, 414, 416).
3) If NZC' is greater than $\eta$ (see below), that pixel is defined as a texel 424. Otherwise, the pixel belongs to a QC region 426. The process continues for each window 450, 451 of each frame 460, 461 of video 100.

$\eta$ is determined as follows. Over a QC region, each pixel value follows a Gaussian distribution $N(0,\sigma)$ (by assumption). $\beta$ is approximately equal to $1.226\sigma$, and the probability that a pixel is not set to zero is approximately 0.125. For each non-zero pixel, the maximum contribution to NZC' is 4 as the pixel could be counted 4 times as part four directional 1-D countings (horizontal, vertical and two diagonal). Thus, a good first approximation value of $\eta$ is $$\eta = n^2 \times 4 \times 0.125$$

Where, $n^2$ is the window size. In a preferred embodiment, the window size is 5×5, and an $\eta$ in the range of 10–12 is adequate.

Searching

Figure 5:
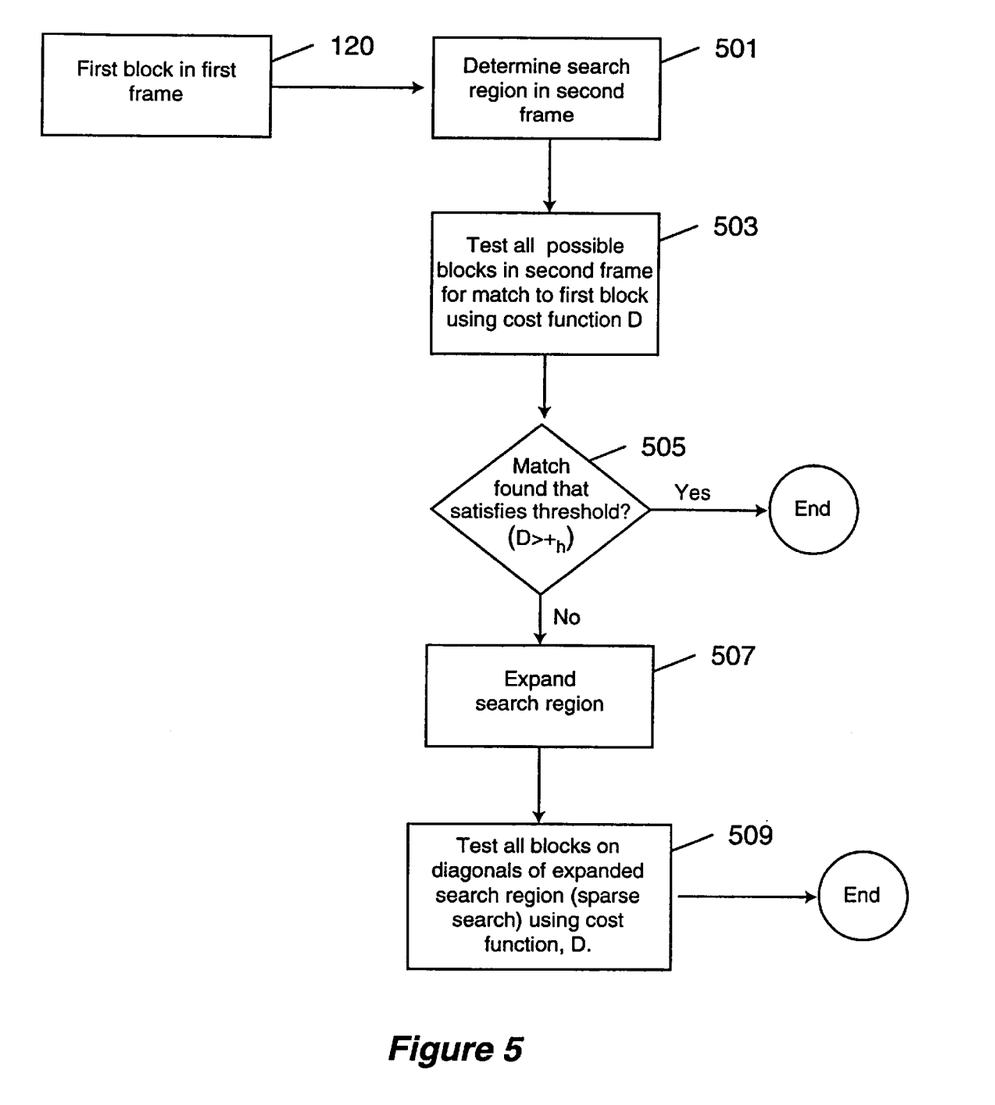
FIG. 5 is a flowchart of one embodiment of a searching technique used in the present invention.

An exhaustive search of all possible candidate blocks in the second frame that could potentially match the first block can be performed, but is generally prohibitively expensive in terms of computational cost. Referring to FIG. 5, in one embodiment a two-stage search procedure is used. First, a search region around a central pixel in the first block 120 is determined in the second frame 501. For example, for an 8×8 pixel first block, a search region of 16×16 pixels, centered around the corresponding central pixel position of the first block, is chosen in the second frame. All possible combinations of 8×8 blocks within the 16×16 search region are tested for a match to the first block using a cost function (see cost function below) 503. If a sufficiently good match is not found within the first search region (e.g., 16×16) 505, the search region is expanded, for example to 32×32 pixels 507. The decision to expand the search region is governed by a threshold, $t_h$, and the value of the cost function, D. If $D > t_h$ then the search region is expanded. In one embodiment, $t_h$, is approximately $n^2/2$ where $n^2$ is the block size (e.g., 8×8).

All possible blocks in the expanded search region are tested for a match using the cost function (see below). In one embodiment a sparse search is performed in the expanded search region. For example, all blocks centered around the pixels along the diagonals of the expanded search region are searched for a best match 509.

Cost Function

Figure 6:
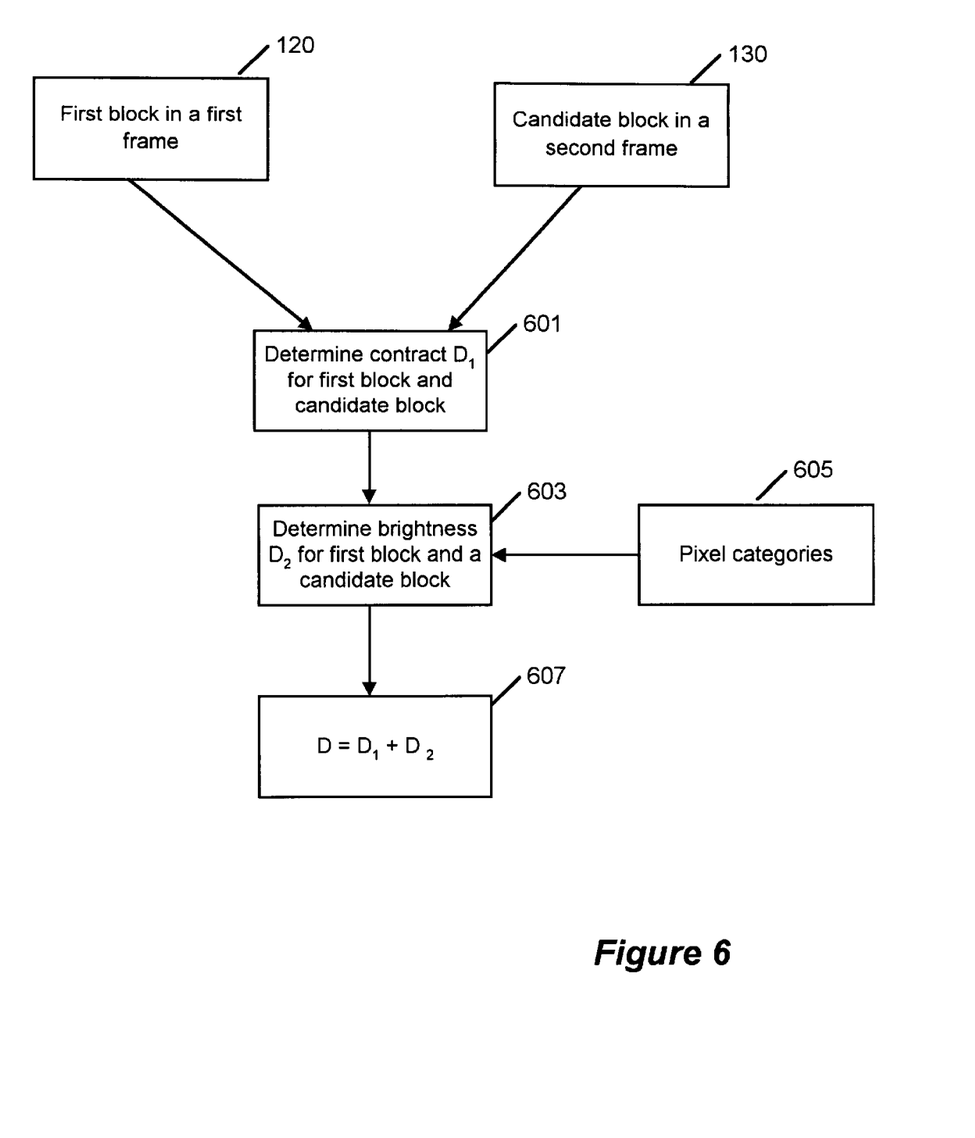
FIG. 6 is a flowchart of the computation of a cost function.

Referring now to FIG. 6, a first block in a first frame 120 is matched to a candidate block in a second frame 130 by minimizing a cost function measuring the mismatch between the first block and each candidate block. Several conventional cost functions can be employed. In one embodiment, $M_i$ defines a macroblock in the current frame in $I_c$, where $I_c$ is the current frame. v is the displacement vector of a candidate block in $I_0$, where $I_0$ is the reference frame. The optimal displacement (motion vector) is obtained by the formula:

$$v_i^* = \arg \min_{v \in V} \sum_{\bar{x} \in M_i} D[I_c(\bar{x}) - I_o(\bar{x} + v)]$$

where V is the search range for the possible motion vector. The cost function D is defined in terms of the visual measures of contrast 601, $D_1$, plus brightness 603, $D_2$. Let $D_1$ represent contrast c as defined by $$c = \alpha_1 + \alpha_2 \cdot \log(f)$$

where $f$ is the intensity value, and $\alpha_1$ and $\alpha_2$ are determined empirically (see below). When the intensity of the first block is subtracted from the intensity of the candidate block (e.g., pixel by pixel) a residual block is obtained. Let $d_1$ be the absolute pixel value of a typical pixel in the residual block. The contrast measure of this residual image can be used to define $D_1$ as $$D_1 = \alpha_1 + \alpha_2 \cdot \log(1 + d_i)$$

The constant 1 is added to the argument of the log function to avoid singularity. When all the $d_i$'s are zero, $D_1$ should be zero. So, $\alpha_1$ is zero. The maximum value of $d_i$ is assumed to be 255, and this leads to the maximum value of $D_1 = 1$; and $\alpha_2 = 0.416$.

In this embodiment of the cost function, the other component of cost function, D, is defined by brightness $D_2$. To obtain the brightness measure, the contrast function c(x,y) is passed through a filter with lateral inhibition to obtain the brightness function. See for example, A. K. Jain, Fundamentals of Digital Image Processing, Prentice Hall, N.J., 1989. A typical transfer function of this filter is $$H(\zeta_1, \zeta_2) = H_p(\rho) = A \cdot (\rho/\rho_0) \cdot \exp[-(\rho/\rho_0)^\beta]$$

where $$\rho = \sqrt{\xi_1^2 + \xi_2^2},$$

and $\zeta_1$ and $\zeta_2$ are spatial frequencies. This transfer function measures the brightness of the residual block indirectly. If the first block and a candidate block match perfectly, the brightness of the residual block is completely flat, and no spatial frequency is present. A higher spatial frequency indicates a mismatch.

At the pixel level, when a quasi-constant pixel is mistaken as a dominant edge, the residual brightness block at this position contains very high spatial frequency because of the presence of an impulse (e.g., a black dot with a white background, or vice versa). If a texel is mistaken as an edgel or a quasi-constant pixel as a texel, moderate spatial frequencies are present at the position; otherwise, there is no strong spatial frequency present in the brightness residual block. Using this content-specific pixel category information, $D_2$, is determined as $D_2=1.00$ when $P_0(x,y) \in E$ and $P_c(x,y) \in Q$; or $\Leftrightarrow$ $D_2=0.64$ when $P_0(x,y) \in T$ and $P_c(x,y) \in Q$; or $\Leftrightarrow$ $D_2=0.64$ when $P_0(x,y) \in T$ and $P_c(x,y) \in E$; or $\Leftrightarrow$ $D_2=0.00$ otherwise.

Where E, Q, and T represent the set of edges, quasi-constant pixels, and texels, respectively; $P_0$ (x,y) denotes the label of the pixel in the first block, and $P_c$ (x,y) denotes the label of the pixel in the candidate block. The symbol <=> means vice versa. The values for $D_2$, are obtained from the transfer function H above by setting A=2.6, $\beta$=1.1 and $\rho_0$=8.772. See, for example, A. K. Jain, Fundamentals of Digital Image Processing, Prentice Hall, Englewood Cliffs, N.J., 1989. The peak spatial frequency (corresponds to mismatch of edgel and QC pixel) is assumed to be 8 cycles/degree, and the mid-frequency is assumed to be 4 cycles/degree (corresponds to mismatch of edgel and texel, or texel and QC pixel). Thus, through the term $D_2$, (brightness) the cost function is determined as a function of pixel categories 605.

Both $D_1$ and $D_2$, are normalized to unity. For any residual block, the total cost function is defined as $$D = D_1 + D_2,$$

summed over all the pixels inside the block 607. A weighted sum for $D_1$ and $D_2$ can also be used for D.

The motion estimation or displacement method of the present invention can also be applied to color images or videos. Each color image or frame is represented by three gray level images. The most common representation of a color image is by R-G-B frames or Y-U-V frames. In one embodiment, the motion or displacement estimation method is only performed on one frame, e.g., the Y frame, and is used for all three frames.

Video Processing

Information or video source providers often process images or videos for compression, coding, filtering, noise removal, and enhancement. This processing is often done as a pre-processing step before transmission or recording, and can be done "off-line." Noise is often introduced into a video because of, for example, imperfect initial signal generation, handling operations, and the storage medium itself. In one embodiment of the invention, the motion or displacement estimation method described above is used in an adaptive temporal filtering method to remove noise from a video. The pixel categories can also be used in an adaptive spatial filtering method.

Adaptive Temporal Filtering

Figure 7:
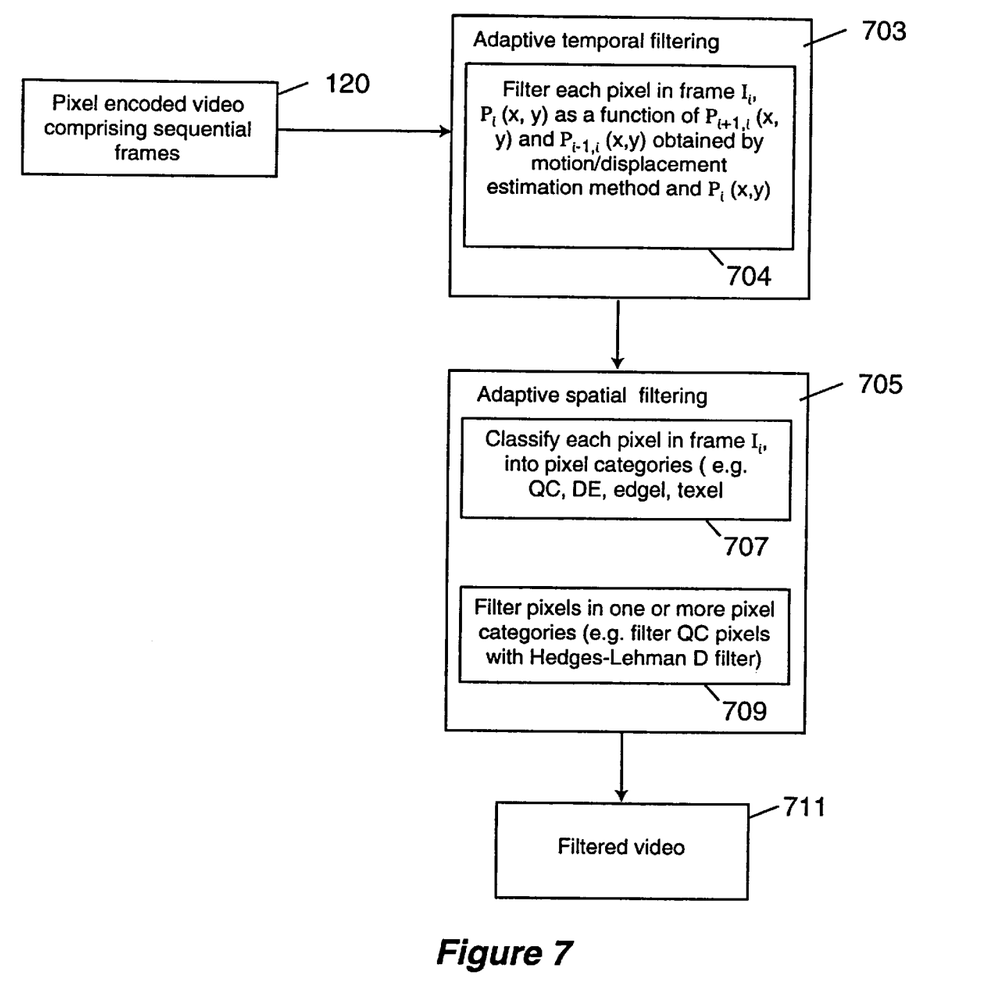
FIG. 7 is a flowchart of one embodiment of a pre-processing step comprising the motion/displacement estimation method of the present invention.

Referring now to FIG. 7, adaptive temporal filtering 701 is performed on a sequence of temporal frames or images 100. A video comprises a sequence of frames or images:

$$I_1 \ldots I_{(i-1)}, I_i, I_{(i+1)} \ldots I_n$$

The predicted image of $I_i$ from $I_{(i-1)}$ is $I_{(i-1),i}$. Similarly, the predicted image of $I_i$ from $I_{(i+1)}$ is $I_{(i+1),i}$. In one embodiment, the three images $I_i$, $I_{(i-1),i}$ and $I_{(i+1),i}$ are used for temporal filtering of $I_i$. Additional images before and after image $I_i$ (e.g., $I_{(i-2)}$, $I_{(i-1)}$, $I_i$, $I_{(i+1)}$, $I_{(i+2)}$) can also be employed, and need not be symetric or consecutive about $I_i$.

$P_i(x,y)$ is the $(x,y)^{th}$ pixel value in frame $I_i$. $P_{i-1,i}(x,y)$ is the $(x,y)^{th}$ pixel value in the $I_i^{th}$ motion-compensated frame using $I_{i-1}$. Similarly, $P_{i+1,i}(x,y)$ is the $(x,y)^{th}$ pixel value in the $I_i^{th}$ motion-compensated frame using $I_{i+1}$. Motion compensation can be determined, for example, using the motion or displacement estimation method as described above 704.

Filtering is done on a pixel-by-pixel basis. Frame $I_i$ is temporally filtered by:

$$\hat{P}_i(x,y) = \alpha \cdot P_{i-1,i}(x,y) + \beta \cdot P_{i+1,i}(x,y) + (1-\alpha-\beta) \cdot P_i(x,y)$$

The parameters $\alpha$ and $\beta$ are chosen as follows:

$$\text{If } |P_i(x,y) - P_{i-1,i}(x,y)| < \tau; \alpha = 0.33 \qquad \text{(eqn. A)}$$

$$\text{Otherwise } \alpha = \frac{1}{1 + k \exp[\gamma(d-\tau)]}$$

$$\text{where } d = |P_i(x,y) - P_{i-1,i}(x,y)| \qquad \text{(eqn. B)}$$

In one embodiment, $\alpha=\beta$. If $d=\tau$, equations A and B should be identical, and thus k=2. If it is assumed that $d=2\cdot\tau$, and $\alpha$ is one-half of its maximum value, then $\gamma=0.92/\tau$. The parameter $\tau$ is determined empirically. In one embodiment, $\tau$ has been set to 10. The parameter $\tau$ has the following intuitive meaning: it is the range of pixel values within which the predicted values are assigned maximum weights (0.33) for filtering.

Adaptive Spatial Filtering

Adaptive spatial filtering 705 is performed on a single frame or image $I_i$, without reference to related temporal motion-compensated frames (e.g., $I_{(i-1),i}$ and $I_{(i+1),i}$). First, the pixels in frame $I_i$ are classified into two or more categories as described above (e.g., three categories of QC pixels, texels, and DE edges) 707. In one embodiment, no spatial filtering is performed for the texels and the edges because these regions generally have some noise masking ability (unless some artifacts such as ringing or jagged contours due to low bit-rate coding are introduced).

The QC pixels are spatially filtered using the conventional D Filter (e.g., the Hodges-Lehmen D. Filter) 709. The D Filter is known to be very efficient and robust in smoothing out short-tailed quantization noise. See generally, P. J. Bickel and J. L. Hodges, "The Asymptotic Theory of Galton's Test and a Related Simple Estimate of Location," Annals of Mathematical Statistics, 38, pp. 73–89, 1967.

According to the Hodges-Lehman D filter, let $X_i$, $1 \leq i \leq n$ be a sample from a population with distribution $F(x, \theta)$ and density $f(x, \theta)$ where $f(.)$ is symmetric about zero, continuous, and strictly positive on the convex support of F, $[x:0 < F(x) \leq 1]$. Denote $X_1, \ldots, X_n$ as the order statistics of the sample. Let n=2m or 2m−1. In either case, the D filter output is defined as:

$$D_n(x_1, \ldots, x_n) = \text{median } _{1 \leq i \leq m}(X_i, X_{(n-i+1)})/2$$

Under the thresholded D filter, pixels with intensity values in the range (c−Range) and (c+Range) are selected. The D filter is applied only to the pixels within this range. Usually, c is the intensity value of the central pixel in the window.

In one embodiment, one pass of temporal filtering, and one pass of spatial filtering (e.g., a 3×3 D filtering) is used over the QC pixels.

For color images, the individual R, G and B components are filtered using the temporal and spatial filtering methods described above. In one embodiment, the 3-way pixel classification information is obtained from the 3-way pixel classification of the Y image where the greyscale image Y is defined as $Y = 0.2999 \cdot R + 0.587 \cdot G + 0.114 \cdot B$.

Temporal filtering 701 and spatial filtering 705 can be performed on video 100 together or separately. Filtering or removing noise according to the present invention, temporally and/or spatially, produces a more visually appealing image or video 711. Removing noise, and many of the undesired frequencies, according to the present invention also results in fewer coding bits required for encoding an image. For example, using the temporal and spatial filtering method of the present invention results in approximately 10% fewer bits required bit to encode a typical JPEG coded image. The bit savings are considerably greater for very low bit-rate coding. In addition, images pre-processed and filtered according to the present invention uniformly maintain a better visual quality under compression.

Figure 8:
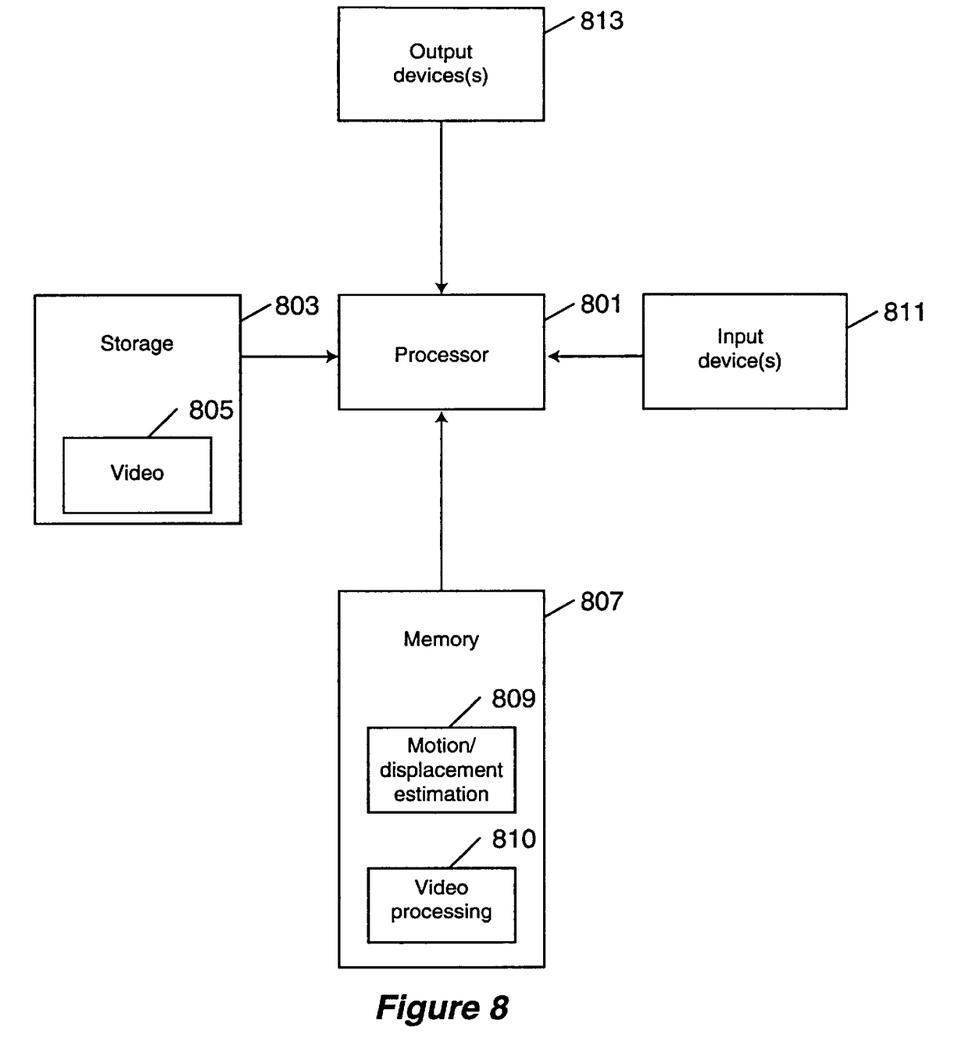
FIG. 8 is a block diagram of one embodiment of the motion/displacement estimation system of the present invention.

Referring now to FIG. 8, there is shown a block diagram of hardware and software elements of a typical implementation of one embodiment of the present invention. Processor 801 is a conventional engineering workstation processor or other computer central processing unit (CPU), such as an Intel 80×86 series, Intel Pentium, or Motorola 68000 series processor. Processor 801 may also be coupled to other processors accessible over conventional communications channels or buses (not shown).

Processor 801 is conventionally coupled to storage 803 which may be magnetic disk storage, a CD storage unit, or other conventional computer data storage unit. Storage 803 may also be coupled to other storage units accessible over conventional communications channels or buses (not shown). Storage 803 comprises image storage 805 for electronically storing images 100. Images 100 may be stored in standard digitally encoded forms, for example, MPEG or JPEG. Such images 100 are retrievable by processor 801.

Processor 801 is also conventionally coupled to memory 807 which is a random access memory (RAM) unit or other conventional computer memory. Memory 807 preferably comprises motion or displacement estimation 809 and/or video processing 810 programs or modules. Programs 809, 810 comprise instructions executable on processor 801 to perform the various functions of the present invention (as described above). Programs 809, 810 may alternatively be stored in storage 803 and accessed by processor 801 in memory 807 when required. Memory 807 and/or storage 803 is modified by the implementation of displacement estimation 809 and/or video processing 810 programs in memory 807.

Conventional input devices 811 such as a mouse, keyboard, joystick, drawing tablet, touchscreen, and/or light pen, are also coupled to processor 801. Conventional output devices 813, such a computer monitor or display and/or printer are coupled to processor 801.

In a preferred embodiment, the invention may be implemented on a commercially available computer system such as: IBM/Microsoft Windows, Apple/Apple System OS, Sun/Sun OS, HP/XWindows/MOTIF, VAXJVMS, and the like.

The above description is included to illustrate the operation of the preferred embodiments and is not meant to limit the scope of the invention. From the above discussion, many variations will be apparent to one skilled in the art that are yet encompassed by the spirit and scope of the invention. The scope of the invention is limited only by the following claims.

I claim:

1. In a computer comprising memory, a method for matching a block in a first frame to a block in a second frame, the method comprising the steps of:

receiving a first frame comprising a first block, the first block comprising pixels;

classifying each pixel in the first block into three or more pixel categories;

receiving a second frame comprising a plurality of candidate blocks, each candidate block comprising pixels;

classifying each pixel in each candidate block into the pixel categories; and matching the first block to a candidate block as a function of the pixel categories, wherein the matching step comprises minimizing a cost function that measures the mismatch between the first block and each candidate block, and wherein the cost function comprises a contrast component and a brightness component, and the brightness component is determined as a function of the pixel categories.

2. In a computer comprising memory, a method for filtering a plurality of frames, said frames having a sequential order, the method comprising the steps of:

selecting a current frame from the plurality of frames;

selecting at least one frame having a lower sequential position in the sequential order relative to the current frame;

selecting at least one frame having a higher sequential position in the sequential order relative to the current frame;

determining for at least one pixel in the current frame, a related pixel in the at least one lower sequential position frame and a related pixel in the at least one higher sequential position frame; and filtering the pixel in the current frame as a function of the related pixel in the at least one lower sequential position frame and the related pixel in the at least one higher sequential position frame, wherein the pixel in the current frame is filtered according to the equation:

$$P_i(x,y) = \alpha \cdot P_{i-1,i}(x,y) + \beta \cdot P_{i+1,i}(x,y) + (1-\alpha-\beta) \cdot P_i(x,y)$$

where $P_i(x,y)$ is the $(x,y)^{th}$ pixel value in the current frame $I_i$;

$P_{i-1,i}(x,y)^{th}$ pixel value in the current frame and is the motion-compensated version of the at least one lower sequential position frame $I_i$ using $I_{i-1}$;

$P_{i+1,i}(x,y)$ is the $(x,y)^{th}$ pixel value in the at least one higher sequential position frame and is the motion-compensated version of the at least one lower sequential position frame $I_i$ using $I_{i+1}$ and $\alpha$ and $\beta$ are variables.

3. In a computer comprising memory, a method for filtering a plurality of frames, said frames having a sequential order, the method comprising the steps of:

selecting a current frame from the plurality of frames;

selecting at least one frame having a lower sequential position in the sequential order relative to the current frame;

selecting at least one frame having a higher sequential position in the sequential order relative to the current frame;

determining for at least one pixel in the current frame, a related pixel in the at least one lower sequential position frame and a related pixel in the at least one higher sequential position frame; and filtering the pixel in the current frame as a function of the related pixel in the at least one lower sequential position frame and the related pixel in the at least one higher sequential position frame;

wherein the related pixel in the at least one lower sequential position frame and the related pixel in the at least one higher sequential position frame are determined from the pixel in the current frame, according to the following steps:

classifying the pixel in the current frame into three or more pixel categories;

classifying each pixel in the at least one lower sequential position and at least one higher sequential position frames into the pixel categories;

matching the pixel in the second frame to a pixel in the first frame, and matching the pixel in the second frame to a pixel in the third frame as a function of the pixel categories, wherein the matching step comprises minimizing a cost function that measures the mismatch between the pixel in the current frame and each pixel in at least one of the at least one lower sequential position frame and the at least one higher sequential position frame, and wherein the cost function comprises a contrast component and a brightness component and the brightness component is determined as a function of the pixel categories.

4. In a computer comprising memory, a method for filtering a plurality of frames, said frames having a sequential order, the method comprising the steps of:

selecting a current frame from the plurality of frames;

selecting at least one frame having a lower sequential position in the sequential order relative to the current frame;

selecting at least one frame having a higher sequential position in the sequential order relative to the current frame;

determining for at least one pixel in the current frame, a related pixel in the at least one lower sequential position frame and a related pixel in the at least one higher sequential position frame; and filtering the pixel in the current frame as a function of the related pixel in the at least one lower sequential position frame and the related pixel in the at least one higher sequential position frame, wherein the filtering step filters the brightness of the pixel in the current frame as a function of the brightness of the pixel in the at least one lower sequential position frame and the brightness of the pixel in the at least one higher sequential position frame.

5. In a computer comprising memory, a method for filtering a plurality of frames, said frames having a sequential order, the method comprising the steps of:

selecting a current frame from the plurality of frames;

selecting at least one frame having a lower sequential position in the sequential order relative to the current frame;

selecting at least one frame having a higher sequential position in the sequential order relative to the current frame;

determining for at least one pixel in the current frame, a related pixel in the at least one lower sequential position frame and a related pixel in the at least one higher sequential position frame; and filtering the pixel in the current frame as a function of the related pixel in the at least one lower sequential position frame and the related pixel in the at least one higher sequential position frame, wherein the filtering step filters the contrast of the pixel in the current frame as a function of the contrast of the related pixel in the at least one lower sequential position frame and the contrast of the related pixel in the at least one higher sequential position frame.

6. In a computer comprising memory, a method for matching a block in a first frame to a block in a second frame, the method comprising the steps of:

receiving a first frame comprising a first block, the first block comprising pixels;

classifying each pixel in the first block into three or more pixel categories;

receiving a second frame comprising a plurality of candidate blocks, each candidate block comprising pixels;

classifying each pixel in each candidate block into the pixel categories; and matching the first block to a candidate block as a function of the pixel categories, wherein the matching step comprises minimizing a cost function that measures the mismatch between the first block and each candidate block, and wherein the cost function comprises a contrast component and a brightness component, and the brightness component is determined as a function of the pixel categories, and wherein the contrast component is determined according to the equation:

$$D_1(x,y) = \text{contrast}_{(Candidate\ Block-First\ Block)}$$

where (Candidate Block–First Block) is a pixel-by-pixel intensity subtraction for the pixels in the candidate blocks and the pixels in the first block; and contrast=$0.416 \cdot \log(1+1f1)$, $1f1$ being the absolute intensity value of a particular pixel (x,y).

7. In a computer comprising memory, a method for matching a block in a first frame to a block in a second frame, the method comprising the steps of:

receiving a first frame comprising a first block, the first block comprising pixels;

classifying each pixel in the first block into three or more pixel categories;

receiving a second frame comprising a plurality of candidate blocks, each candidate block comprising pixels;

classifying each pixel in each candidate block into the pixel categories; and matching the first block to a candidate block as a function of the pixel categories, wherein the matching step comprises minimizing a cost function that measures the mismatch between the first block and each candidate block, and wherein the cost function comprises a contrast component and a brightness component, and the brightness component is determined as a function of the pixel categories, and wherein the brightness component is determined according to the equations:

$D_2(x,y)=1.00$ when $P_0(x,y) \in E$ and $P_c(x,y) \hat{I} Q$; or $\Leftrightarrow$ $D_2(x,y)=0.64$ when $P_0(x,y) \in T$ and $P_c(x,y) \hat{I} Q$; or $\Leftrightarrow$ $D_2(x,y)=0.64$ when $P_0(x,y) \in T$ and $P_c(x,y) \hat{I} E$; or $\Leftrightarrow$ $D_2(x,y)=0.00$ otherwise.

where the symbols E, Q, and T represent pixels in the dominant edge, quasi-constant, and textural pixel categories, respectively;

$P_0(x,y)$ denotes a pixel in the first block;

$P_c(x,y)$ denotes a corresponding pixel in the candidate block; and the symbol $\Leftrightarrow$ means vice versa.

* * * * *